United States Patent [19]

Lin

[11] Patent Number: 5,482,307
[45] Date of Patent: Jan. 9, 1996

[54] FOOTREST ASSEMBLY FOR MOTORCYCLE

[76] Inventor: Frank Lin, No. 377, Sec. 1, Changmei Road, Changhua, Taiwan

[21] Appl. No.: 255,084

[22] Filed: Jun. 7, 1994

[51] Int. Cl.$^6$ ..................................................... B62H 1/08
[52] U.S. Cl. ............................................. 280/291; 74/564
[58] Field of Search ............................. 280/291, 288.4; 180/219; 74/564; 296/75

[56] References Cited

U.S. PATENT DOCUMENTS 4,591,179  5/1986  Nakamura ........................... 74/563 X

FOREIGN PATENT DOCUMENTS 718729    1/1932   France ................................. 280/291
1062222   4/1954   France ................................. 280/291
223326   10/1924   United Kingdom .................... 280/291

Primary Examiner—Kevin T. Hurley
Attorney, Agent, or Firm—Merchant, Gould, Smith, Edell, Welter & Schmidt

[57] ABSTRACT

A improved footrest includes a supporting bracket which is made from rigid material and a supporting stuffing which is made from soft material. The first supporting bracket has a hollow chamber at its center and is provided with a plurality of elongate slots formed in its wall. The supporting stuffing has a passage defined in the center and a plurality of projecting ribs formed on its outer surface in alignment with the slots of the supporting bracket. A shaft member is received and retained within the passage of the supporting stuffing to provide a rigid support to the supporting stuffing and the supporting bracket. The shaft member has a cylindrical recess at one end and a hole is provided through the outer wall of the shaft member such that the hole is in communication with the recess. A connecting adaptor has a lug at one end and a shaft at the other end. The lug of the connecting adaptor has a hole therein and can be attached to a frame of the motorcycle using a bolt and a nut. The shaft of the connecting adaptor is provided with an annular slot in alignment with the hole of the shaft member. Accordingly, the connecting adaptor is rotatably retained within the shaft member by utilizing a dowel screw which passes through the hole of the shaft member and projects into the annular slot of the shaft of the connecting adaptor. Accordingly, an improved footrest assembly which provides excellent support and frictional contact is achieved.

1 Claim, 5 Drawing Sheets

FIG.1-A PRIOR ART

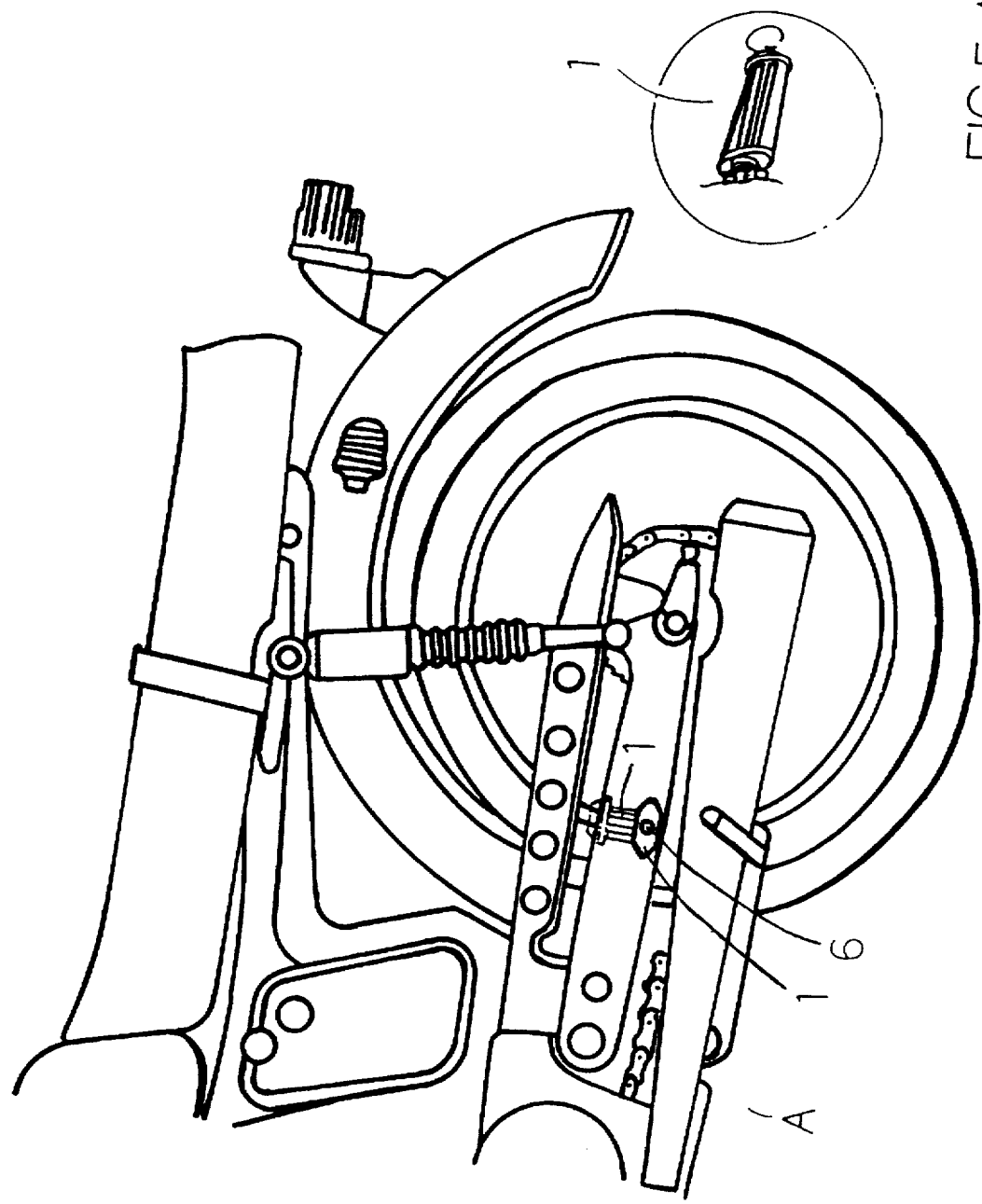

FOOTREST ASSEMBLY FOR MOTORCYCLE

BACKGROUND OF THE INVENTION

This invention relates to an improved footrest assembly for motorcycle. This footrest assembly includes a first supporting bracket which is made from rigid material and a supporting stuffing which is made from relatively soft material. The first supporting bracket has a hollow chamber at its center and is provided with a plurality of elongate slots formed in its wall. The supporting stuffing has a passage formed through its center and a plurality of projected rib portions formed on its outer surface in alignment with the slots of the supporting bracket. A shaft member is received and retained within the passage of the supporting stuffing to provide a rigid support to the support stuffing and the supporting bracket. The shaft member has a cylindrical recess at one end and a hole is provided through the outer wall of the shaft member such that the hole is in communication with the recess. A connecting adaptor has a lug at one end and a shaft at the other end. The lug of the connecting adaptor has a hole therein and can be attached to a frame of the motorcycle using a bolt and a nut. The shaft of the connecting adaptor is provided with an annular slot in alignment with the hole of the shaft member. Accordingly, the connecting adaptor is rotatably retained within the shaft member by utilizing a dowel screw which passes through the hole of the shaft member and projects into the annular slot of the shaft of the connecting adaptor. Accordingly, an improved footrest assembly which provides excellent support and frictional contact is achieved.

Motorcycles are the main mode of transportation for most white collar workers and salesmen due to its convenience and mobility. It has become a main mode of transportation for modern society. The motorcycle has also been provided with a footrest for a passenger. As shown in FIG. 1, a conventional footrest A1, mounted to the frame A of a motorcycle has a simple configuration. Referring to FIG. 1A, it discloses a detailed view of the conventional footrest A1 shown in FIG. 1. The footrest A1 includes a shaft rod A2 which has a traverse hole which can be pivotedly installed onto a bracket provided by the frame A of the motorcycle. The shaft rod A2 is enveloped with a plastic sleeve A3. This has a simple configuration and the manufacturing cost is low and the assembling process is simple. But, a passenger's foot rests on the plastic sleeve A3 which has a poor fictional force. Besides, the embossment provided by the plastic sleeve A3 is easily worn out, and the frictional contact between the foot and the footrest is completely lost. Accordingly, when the motorcycle is driven at a comparatively high speed, and encounters a rugged road, the foot can not easily rest on the footrest and tends to slip off or bounce thereof easily. If the passenger's foot looses its support from the footrest A1 not only will it bring a negative influence to the steerability of the motorcycle, but it will also generate a dangerous situation if the unsupported foot bumps into an obstacle.

In addition, the plastic sleeve A3 is a simple layer of plastic sheet which can not absorb any vibration during riding. Accordingly, it is very uncomfortable when vibration is directly transferred to the arch portion of the passenger's foot.

SUMMARY OF THE INVENTION

It is the object of this invention to provide an improved footrest assembly which provides a durable support to the foot of the passenger.

In order to achieve the object set forth, the footrest assembly includes a first supporting bracket which is made from rigid material and a supporting stuffing which is made from relatively soft material. The first supporting bracket has a hollow chamber at its center and is provided with a plurality of elongate slots formed in its wall. The supporting stuffing has a passage formed through its center and a plurality of projected rib portions formed on its outer surface in alignment with the slots of the supporting bracket. A shaft member is received and retained within the passage of the supporting stuffing to provide a rigid support to the support stuffing and the supporting bracket. The shaft member has a cylindrical recess at one end and a hole is provided through the outer wall of the shaft member such that the hole is in communication with the recess. A connecting adaptor has a lug at one end and a shaft at the other end. The lug of the connecting adaptor has a hole therein and can be attached to a frame of the motorcycle using a bolt and a nut. The shaft of the connecting adaptor is provided with an annular slot in alignment with the hole of the shaft member. Accordingly, the connecting adaptor is rotatably retained within the shaft member by utilizing a dowel screw which passes through the hole of the shall member and projects into the annular slot of the shaft of the connecting adaptor. Accordingly, an improved footrest assembly which provides excellent support and frictional contact is achieved.

In a preferable embodiment, the shaft member is rotatably received on the shaft of the connecting adaptor. A dowel screw projects into the annular slot of the shaft of the connecting adaptor. Accordingly, the footrest is rotatable, but in a limited manner; that means, the footrest can rotate to conform to the angular movement of the passenger's foot. In light of this, the foot of the passenger is continuously supported by the footrest assembly despite poor road conditions. As a result, the foot of the passenger will never lose its support from the footrest and the riding salary is further ensured.

In a preferable embodiment of the footrest assembly, the projected rib portion of the supporting stuffing projects beyond the surface of the supporting bracket; accordingly, frictional contact between the foot of the passenger and the footrest is ensured by these projected rib portions. Accordingly, frictional contact can overcome shifting of the sole of the foot during riding, including turning, stopping and starting.

In a preferable embodiment of the footrest assembly, the supporting bracket has an oval cross section to provide a larger contact area with the arch portion of the passenger's foot. The supporting stuffing is made from soft material which provides comfortable contact with the foot.

In a preferable embodiment of the footrest assembly, the shaft of the connecting adaptor is provided with an annular slot. A dowel screw is in contact with the slot through the hole of the shaft member. Accordingly, side movement between the shape member and the connecting adaptor is completely avoided. Accordingly, riding safety is further ensured.

In a preferable embodiment of this footrest assembly, the dowel screw is covered with a layer of retaining grease to prevent it from loosening. Accordingly, durable engagement therebetween is ensured.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of an improved footrest assembly. In the drawings:

3

Figure 1:
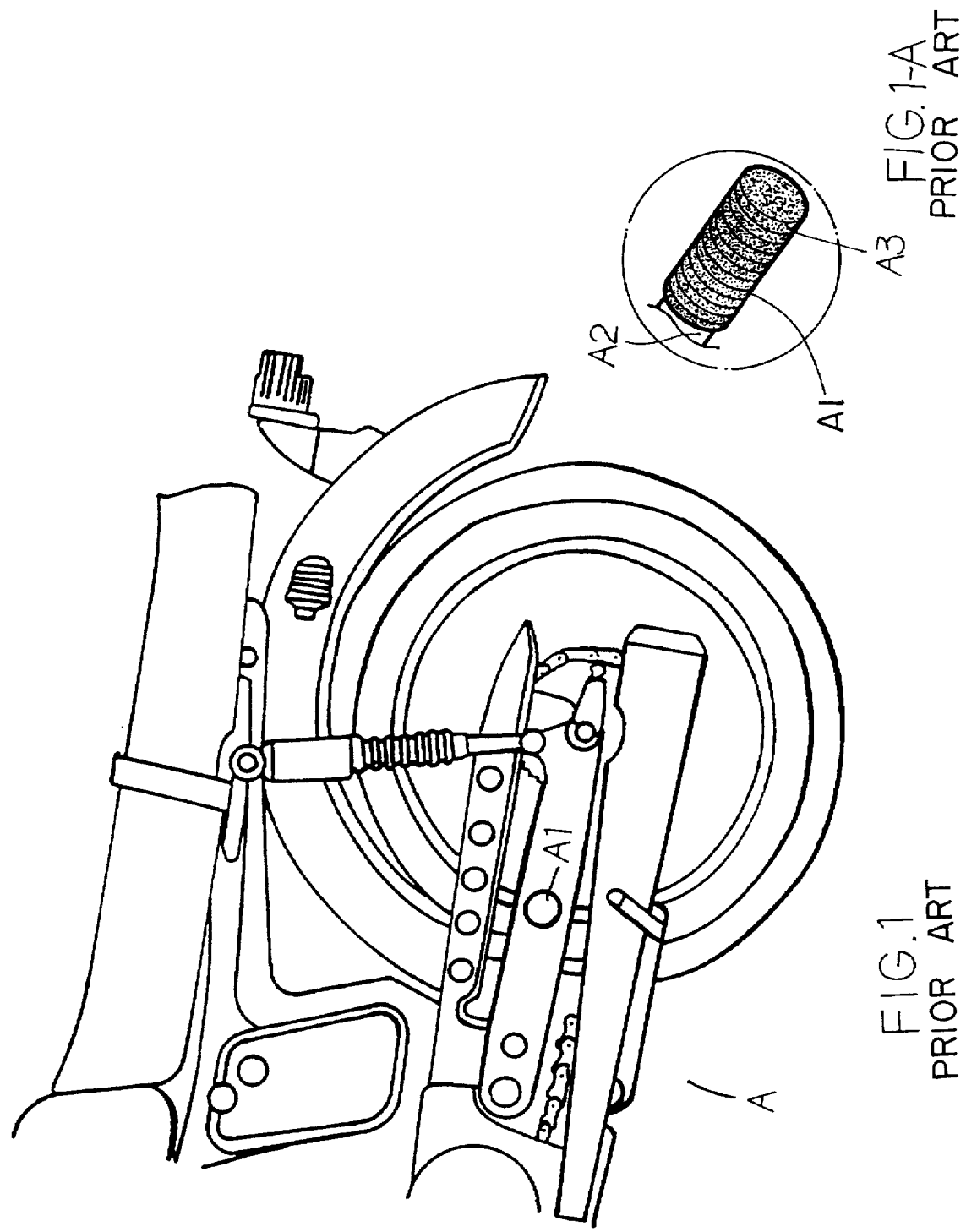
Figure 2:
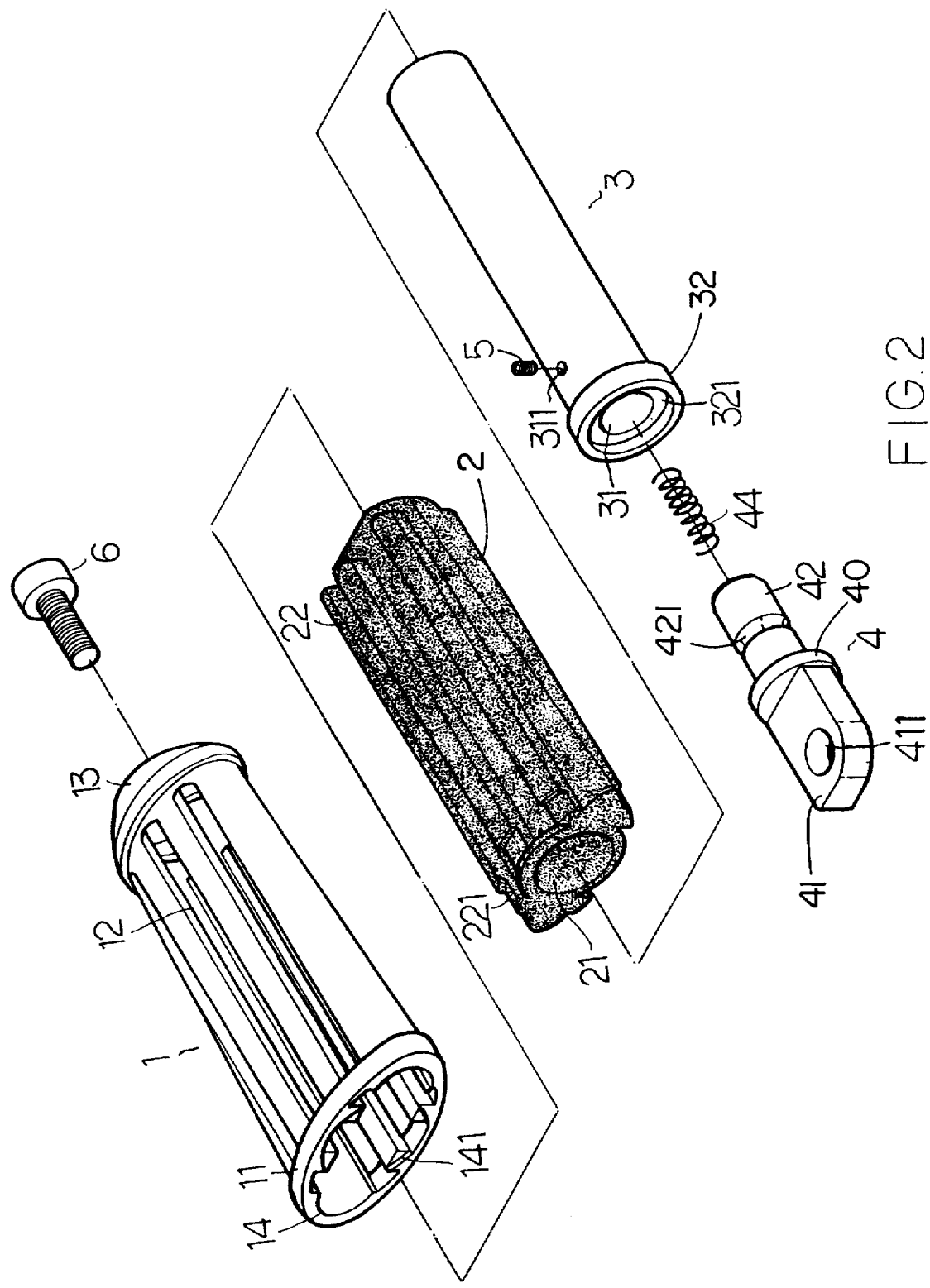
Figure 3:
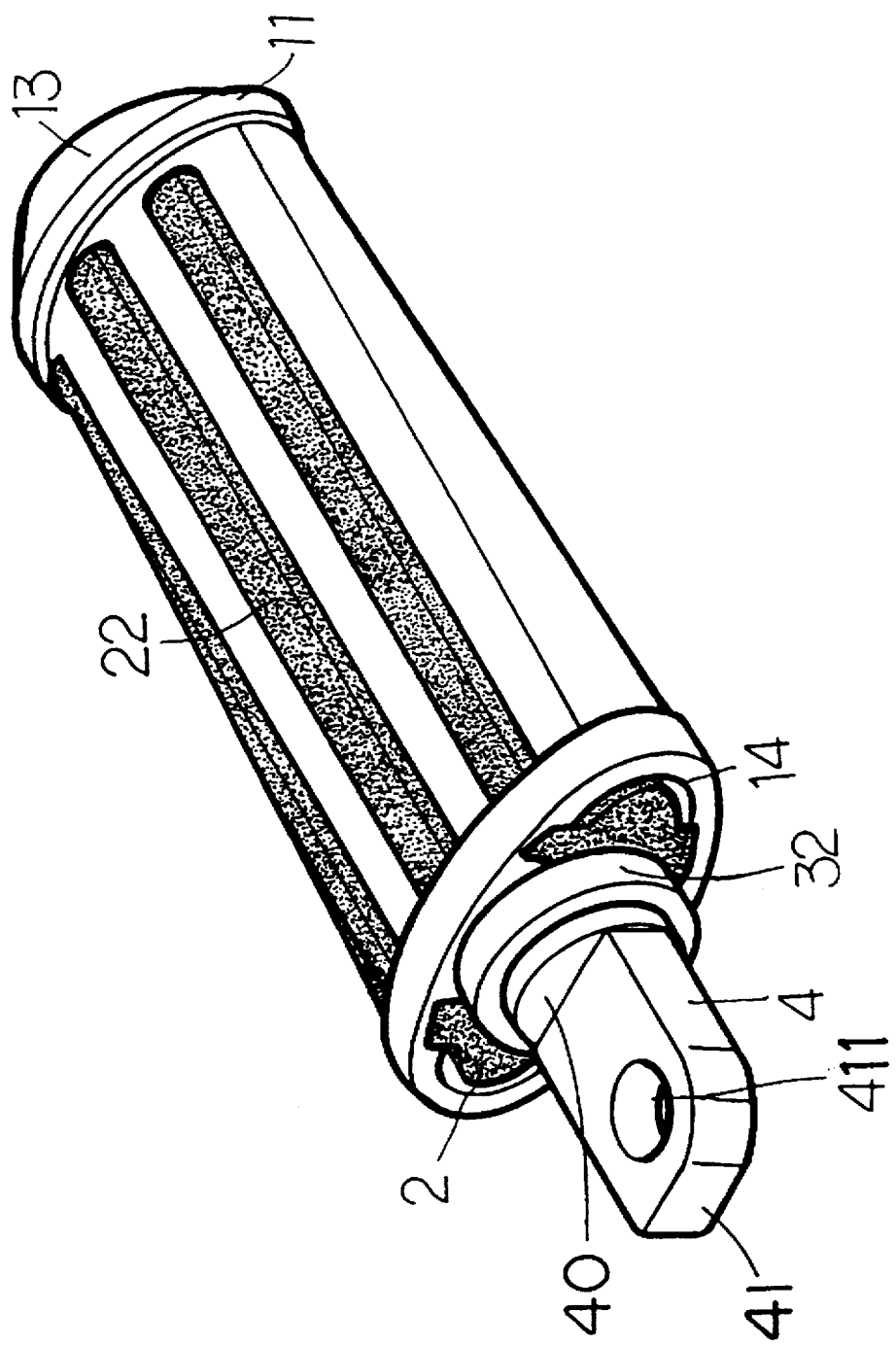
Figure 4:
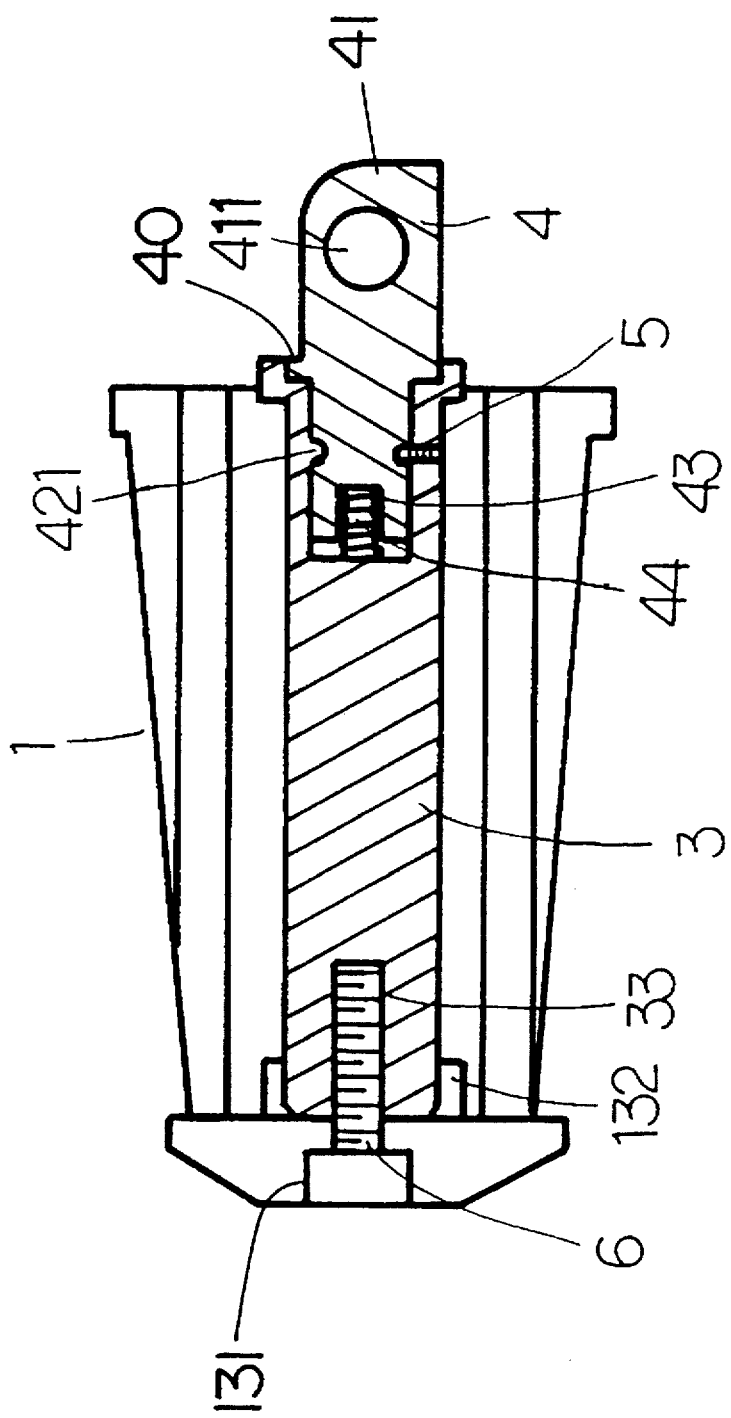

FIG. 1 is a view of a conventional footrest mounted on a motorcycle;

FIG. 1A is an enlarged view of the conventional footrest shown in FIG. 1;

FIG. 2 is an exploded perspective view of the footrest assembly made according to this invention;

FIG. 3 is a perspective view of the footrest assembly made according to this invention;

FIG. 4 is a cross sectional view of the footrest assembly made according to this invention;

FIG. 5 is a view showing the footrest mounted to the frame of a motorcycle; and

FIG. 5A is an enlarged view of the footrest mounted to the frame of the motorcycle shown in FIG. 5.

DETAILED DESCRIPTION OF THE PREFERRED EMBODIMENT

Referring to FIGS. 2, 3 and 4, the footrest assembly made according to this invention includes a first supporting bracket 1 which is made from rigid material and a supporting stuffing 2 which is made from relatively soft material. The first supporting bracket 1 has a hollow chamber at its center and is provided with a plurality of elongate slots 12 formed in its wall. The supporting bracket 1 further includes a flange portion 11 at an end. A cap 13 is attached to the distal end and is provided with a threaded hole 131 thereof. The inner side of the cap 13 is provided with a pair of positioning wedges 132, and the flange 11 at the end 14 opposite to the cap 13 is provided with a pair of curvilinear retaining slots 141.

The supporting stuffing 2 has a passage 21 formed in the center and a plurality of projecting rib portions 22 formed on its outer surface in align with the slot 12 of the supporting bracket 1. The projecting rib portions 22 of the supporting stuffing 2 include a recessed portion 221 formed at each end of the rib portions which are retained by the flange 11 of the supporting bracket 1. The supporting stuffing 2 is inserted into the supporting bracket 1 from the end 14. When the supporting stuffing 2 is completely seated, the projecting rib portions 22 project beyond the surface of the supporting bracket 1 through the slots 12.

A shaft member 3 is received and retained within the passage 21 of the supporting stuffing 2 to provide a rigid support to the support stuffing 2 and the supporting bracket 1. The shaft member 3 has a cylindrical recess 31 at one end and a hole 311 is provided at the outer wall such that the hole 311 is in communication with the recess 31. A flange 32 is provided at one end of the shaft member. An annular slot 321 is disposed within the flange 32. The distal end of the shaft member 3 is provided with a threaded hole 33.

A connecting adaptor 4 has a lug 41 which has a hole 411 at one end and a shaft 42 at the other end. The lug can be easily attached to the frame A of a motorcycle using a bolt and a nut. The shaft 42 of the connecting adaptor 4 is further provided with an annular slot 421 which, when the adaptor 4 is mounted in the recess 31 of the shaft member 3, aligns with the hole 311 of the shaft member 3. The end portion of the shaft 42 is provided with a channel 43 wherein a spring member 44 is disposed. Accordingly, the connecting adaptor 4 is rotatably retained within the shaft member 3 by utilizing a dowel screw 5 which passes through the hole 311 of the shaft member 3 and into the annular slot 421 of the shaft 42 of the connecting adaptor 4.

4

Referring to FIG. 4, when assembling the footrest, the shaft 42 of the connecting adaptor 4 is firstly inserted into the recess 31 in such a manner that the spring member 44 which is disposed within the channel 43 is compressed against the rear inner wall of the recess 31. When the shaft 42 is completely seated, the dowel screw 5 is screwed into the annular slot 421 of the shaft 42 to retain the shaft 42 of the connecting adaptor 4. The shoulder 40 is completely received and retained by the annular slot 321 of the flange 32. Accordingly, side movement therebetween is completely avoided.

The assembled connecting adaptor 4 and the shaft member 3 are inserted into the passage 21 of the supporting stuffing 2. Accordingly, the supporting stuffing 2 together with the connecting adaptor 4 and the shaft member 3 is inserted into the receiving chamber of the supporting bracket 1 from the end 14 in such a manner that the distal end of the supporting stuffing 2 is retained with the positioning wedges 132 of the supporting bracket 1. Meanwhile, the flange 32 of the shaft member 3 is received and retained within the curvilinear retaining slots 141 disposed within the end 14. The projecting rib portions 22 of the supporting stuffing 2 project through the slots 12 of the supporting bracket 1. When the elements are completely seated, a hexagonal bolt 6 is screwed into the threaded hole 33 of the shaft member 3. Then a perfect arrangement of the footrest is completed.

Still referring to FIGS. 2, 3, 4 and 5, the shaft member 3 is shown rotatably mounted onto the shaft 42 of the connecting adaptor 4. As described above, the spring member 44 provides a biasing force between the shaft 42 and the shaft member 3. The dowel screw 5 also provides a pressing force with the annular slot 421 of the shaft 42. By this arrangement, the supporting bracket 1 and the supporting stuffing 2 are rotatable over the shaft 42 of the connecting adaptor 4. Accordingly, continuous contact between a passenger's foot and the supporting bracket 1 and the supporting stuffing 2 is ensured despite the riding conditions.

The projecting rib portions 22 of the supporting stuffing 2 project through the slots 12 of the supporting bracket 1. The recessed portion 221 of the projected portion 22 is retained by the flange 11 of the supporting bracket 1. By this arrangement, frictional contact between the passenger's foot and the supporting stuffing 2 are enhanced. Accordingly, even in the poorest riding conditions, the foot still receives excellent support.

Furthermore, a cross section of the supporting bracket 1 and the stuffing 2 shows an oval configuration; accordingly, the contact area between the passenger's foot and footrest is increased. The stuffing 2 is made from a soft material to provide a comfortable support.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claim.

I claim:

1. A footrest assembly including:
a supporting bracket is made from a rigid material and a supporting stuffing made from a soft material, said supporting bracket having an outer wall defining a hollow chamber at its center and being provided with a plurality of elongate slots formed in the wall, said supporting bracket further including a flange portion at an end, a cap being attached to a distal end of the supporting bracket and being provided with a threaded hole formed therein, the inner side of said cap being provided with a pair of positioning wedges and said flange portion at the end opposite to the cap being provided with a pair of curvilinear retaining slots;

said supporting stuffing having a passage defined in its center and a plurality of projecting rib portions formed on the outer surface thereof in alignment with the slots of the supporting bracket, said projecting rib portions of the supporting stuffing including a recessed portion retained by the flange portion of the supporting bracket, said supporting stuffing insertable into the supporting bracket from its open end, said projecting rib portions projecting beyond the outer surface of the supporting bracket through said slots;

a shaft member being received and retained within the passage of said supporting stuffing to provide a rigid support to said supporting stuffing and said supporting bracket, said shaft member having a cylindrical recess at one end and a hole defined in the wall of the shaft member such that said hole is in communication with the recess, a flange being provided at one end of the shaft member, an annular slot being disposed within the flange, the distal end of said shaft member being provided with a threaded hole;

a connecting adaptor having a lug which has a hole defined at one end and a shaft at the other end, said shaft of said connecting adaptor being further provided with an annular slot in alignment with said hole of said shaft member, the end portion of the shaft being provided with a channel wherein a spring member is disposed, said connecting adaptor being rotatably retained within the shaft member by a dowel screw disposed within said hole of said shaft member and which projects into said annular slot of said shaft of said connecting adaptor.

* * * * *

UNITED STATES PATENT AND TRADEMARK OFFICE
CERTIFICATE OF CORRECTION

PATENT NO. : 5,482,307

DATED : January 9, 1996

INVENTOR(S) : Lin

It is certified that error appears in the above-identified patent and that said Letters Patent is hereby corrected as shown below:

Col. 2, line 22 "shall" should read --shaft--

Col. 2, line 34 "salary" should read --safety--

Signed and Sealed this

Tenth Day of December, 1996

Attest:

BRUCE LEHMAN

Attesting Officer     Commissioner of Patents and Trademarks